Oct. 1, 1968   J. T. BICKMORE   3,404,001

THERMOPLASTIC DEFORMATION IMAGING WITH COLOR REAGENTS

Filed Sept. 17, 1964

INVENTOR
JOHN T. BICKMORE
BY
ATTORNEYS

United States Patent Office 3,404,001
Patented Oct. 1, 1968

3,404,001
THERMOPLASTIC DEFORMATION IMAGING WITH COLOR REAGENTS
John T. Bickmore, Rochester, N.Y., assignor to Xerox Corporation, Rochester, N.Y., a corporation of New York
Filed Sept. 17, 1964, Ser. No. 397,238
1 Claim. (Cl. 96—1.1)

ABSTRACT OF THE DISCLOSURE

A method and recording member for chemical frost which involves placing a color reagent beneath a frostable layer and using the hills and valleys of the frost pattern as a chemical resist so that when the frosted layer is treated with a material capable of undergoing a color forming reaction with the color reagent, a colored, visible image corresponding to the frost pattern is formed beneath the frost layer.

---

This invention relates in general to thermoplastic deformation imaging and more specifically, to a novel diffusion development technique for rendering such images more easily visible.

Great interest has recently arisen in techniques for recording images on thermoplastic layers by the combined application of an electrostatic field and a softening influence upon the thermoplastic. For example, two very recent techniques known as "relief" imaging and "frost" imaging have recently been devised and are more fully described in the current literature. See, for example, an article "A Cyclic Xerographic Method Based on Frost Deformation" by R. W. Gundlach and C. J. Claus appearing in the January-February 1963 issue of the Journal of Photographic Science and Engineering. The rudiments of these techniques involve applying a latent electrostatic image or charge pattern to an insulating thermoplastic film which is softenable as by the application of either heat or a solvent vapor and softening the film until the electrostatic repulsion forces of the charge pattern exceed the surface tension forces of the film. In frost imaging, when this critical or threshold condition is met, a series of very small surface folds or wrinkles are formed on the film with the depth of these folds in any particular surface area of the film being dependent upon the amount of charge in that area thus giving the image produced a frosted appearance over the whole section of the image. This technique has good continuous tone response reproducing large, solid, dark areas and small gradation differences in tone accurately. Relief imaging, on the other hand, although based upon somewhat similar process steps, produces ridge-like deformations in the thermoplastic film at areas of high potential gradient of the applied charge pattern. Since the relief technique produces deformation for the most part only at the edges of the charged areas, it is most suitable for the reproduction of high contrast subjects such as line copy or the like. Once a thermoplastic deformation image of either type is formed upon the surface of the thermoplastic, the image is, according to currently practiced techniques, fixed by allowing or causing the film to re-harden. This re-hardening may be accomplished by removing the heat or solvent vapors which are initially employed to soften the thermoplastic or in the case of a material which is sufficiently soft at room temperature, to deform under the influence of a deposited charge pattern by cooling the material below its freezing point. It has also been found possible to erase such images after they have been viewed by simply re-softening the film and maintaining a low viscosity for a sufficient period of time. Discharge is believed to occur by fluid migration of the ions making up the charge pattern from the top surface of the deformed film while it is still soft during initial deformation and surface tension forces restore a smooth surface to the film upon re-softening so that it is ready for re-use in the system.

The ability to see images of this type is, of course, based on the fact that the deformed surfaces of the thermoplastic serve as light-scattering centers changing the angles of reflection or transmission of incident light. Accordingly, the characteristics of thermoplastic deformation images are dependent upon the viewing or projection system employed. For example, if the images are viewed directly, it is frequently difficult to see them clearly unless they are viewed from the proper angle and, in the case of projection especially with relief-type images, specialized projectors such as a Schlieren projector must be employed if the image is to be seen clearly. In addition, since these thermoplastic deformation imaging techniques depend upon light scattering for visibility of the image, the imaging substrate employed is preferably an initially smooth, non-scattering surface.

Now in accordance with the present invention, it has been found that light scattering, thermoplastic deformation images may be converted to or made to form light absorbing images of the more conventional type which are easily visible by either viewing the image directly or by projection with conventional projectors. This result is achieved by placing one of a pair of color reaction partners beneath a film of a thermoplastically deformable imaging material, forming the deformation image thereon by conventional techniques and then treating the deformed surface with a liquid or gas of the second color reaction partner so that it can diffuse through the layer. Since thermoplastic deformation forms ridges and valleys in the surface of the thermoplastic, diffusion takes place much more rapidly in the valleys which constitute thinner layers of the thermoplastic over the underlying color reaction partner. When diffusion is completed in the valleys, the color reaction takes place beneath them. Since the rate of diffusion through the thermoplastic is related to its thickness and the depth of the valleys formed by the thermoplastic deformation techniques described above is related to the intensity of the charge on the surface of the thermoplastic, the amount of penetrating reagent and the intensity of the color formed by the reaction is directly dependent upon the depth of the valleys. These depths are in turn dependent upon charge intensity originally deposited upon the surface of the thermoplastic. Since the depth of these valleys in the frost-light imaging technique is directly dependent upon the intensity of light striking the charged layers, the image density of the reproduction corresponds with that of the light image originally projected.

It is, therefore, an object of this invention to define a method of thermoplastic deformation imaging capable of forming a light absorbing image.

It is also an object of this invention to define a thermoplastic deformation imaging technique capable of forming light absorbing transparencies.

Yet another object of the invention is to define a thermoplastic deformation imaging technique which does not require an extremely smooth non-light scattering substrate.

A still further object of the invention is to define a novel thermoplastic recording member.

Other objects, features and advantages of the present invention will become apparent upon consideration of the following detailed disclosure of the invention especially when taken in conjunction with the occompanying drawings wherein.

Figure 1:
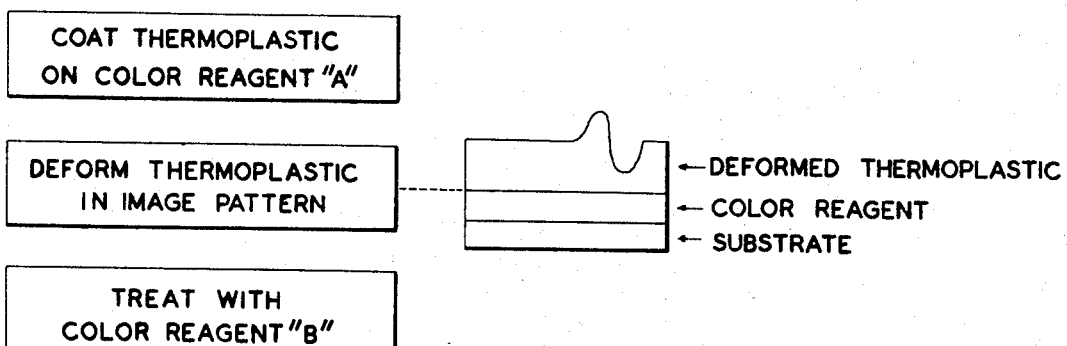
FIGURE 1 is a flow diagram illustrating the process steps of the invention.

The basic process of this invention, as shown in FIGURE 1, consists of coating a layer of a deformable thermoplastic on a layer of a first color reagent A supported by suitable substrate, deforming the thermoplastic in image pattern to produce deformations in the thermoplastic surface which conform to the original image to be reproduced and which are typified by the side sectional view shown next to this process step in FIGURE 2. The surface of the deformed thermoplastic is then treated with a liquid, molten solid or vapor of a second color reagent B which diffuses through the thermoplastic and then reacts with color reagent A beneath the thermoplastic to change its color or transparency. The term "color reagent" should be read in its broadest sense here, since the "color forming reagents" are intended to include not only a pair of reagents which react to form a colored compound from colorless or differently colored initial reagents but also those which go to form a colorless compound from colored reagents, a transparent compound from opaque reagents or vice versa. It is also noted that the "color reagents" need not necessarily actually react with each other to form a compound, but instead both reagents may be included in reagent layer A beneath the thermoplastic and the developing "reagent" may consist of a catalyst or an alkiline or acidic soltuion which causes the included reagents to react with each other. Thus, for example, although reagent layer A may include a diazonium salt and developing reagent B may be a phenol or aromatic amine capable of undergoing the azo dye coupling reaction with the particular diazonium salt, the color reagent A may also include both the diazonium salt and the desired coupler in a layer with a pH such that the coupling reaction does not take place and the developing "reagent" may consist of a material which is capable of changing the pH of the diazonium salt-coupler layer sufficiently to cause the coupling reaction to take place to form a colored azo dye compound.

Although a number of color reagent pairs which may be used as reagents A and B are given in the examples which follow below, any suitable pair of color reagents may be used in this invention. Typical examples of color reagent pairs are as follows: chloranil with p-phenylene diamine which produces black, chloranil with dimethylaniline which produces blue, chloranil with diphenylamine which produces green, tetracyanoethylene with dimethylaniline, tetracryanoethylene with pyrene, tetrazolium chloride with hydroquinone, tetrazolium chloride with iron chloride, tetrazolium chloride with hydrazine, tetrazolium chloride with glucose plus heat, Ninhydrin with amino acids or primary or secondary aliphatic amines as follows, plus heat: (A) ethylenediamine (B) Coco amine (C) aminoethylaminoethanol (D) monoethanolamine (E) polyethylene imine 2,4-dinitro-chlorobenzene plus p-dimethylamino benzaldehyde, phosphomolybdic acid plus reducing agents such as hydroquinone, which produces a blue-green color, N,2,6-trichloro-p-benzoquinoneimine plus a volatile phenol which produces a yellow-orange color followed by an optional ammonia treatment which produces a red color, nitrosodimethylaniline plus dimethylaminobenzaldehyde plus either of ascorbic acid or mercaptobenzothiazole, p-phenylenediamine plus hydrogen peroxide, dimethylaminobenzaldehyde plus acetic anhydride plus p-phenylenediamine, p-phenylenediamine plus aniline plus potassium persulfate iodine plus starch as well as a great number of other well-known color reactions, many of which are described in Fritz Feigls' classic books entitled, Spot Tests in Organic Analysis and Spot Tests in Inorganic Analysis, published by Elsevier Publishing Company.

As can be seen from the sectional view adjacent to second step in the process flow diagram, the cross section of deformed thermoplastic has been shown to include a raised portion or hill and a depressed portion or valley. This type of section is generally found in thermoplastic deformation imaging except for the fact that with the frost-type of imaging, deformation, occurs randomly over large charged areas of the surface of the thermoplastic while with the relief imaging system, such deformation occurs only at the boundary of charged areas or, in other words, in areas of high potential gradient on charged surface areas of the thermoplastic. Since the thermoplastic is thinner in valley portions of the deformation, color reagent B can diffuse through these valley areas of the surface of the thermoplastic much more rapidly than it can through the thicker undeformed and raised areas. Consequently, the color reaction between reagents A and B takes place much more rapidly in these depressed or valley areas. Not only does this method provide color in the valleys of deformed areas, but, in addition, it is capable of providing gradations of color with more intense color being provided in these portions of the color reagent layer beneath the deeper valleys than is provided beneath the shallower valleys because of the differences in thickness of the thermoplastic remaining beneath each of these types of valleys. The system then, is capable of converting a continuous tone frost-type deformation image where valley depth is, for example, proportional to exposure into a continuous-tone, light absorbing colored image. Once the thermoplastic deformation image has been formed, it may also be desirable to treat its top surface with a solvent or partial solvent for it over a short period of time prior to the application of reagent B. This either swells or removes the upper surface of the thermoplastic allowing color forming reagents, which ordinarily could not penetrate even the thermoplastic valleys such as some aqueous reagents, to be employed. This treatment has also been found to very markedly speed up the diffusion of the very slow diffusing reagents reducing diffusion and reaction time from hours to minutes in some cases.

Referring now to FIGURES 2a–2d of the drawings, there are shown four different embodiments of a recording member suitable for use in the process of the invention. The FIGURE 2a embodiment consists of a supporting substrate 11, a layer of a color reagent 12 and an upper layer of a deformable thermoplastic photoconductive insulating layer 13. The FIGURE 2b embodiment of the recording member, on the other hand, consists of a similar substrate 14 overcoated with a layer of a photoconductive insulating color reagent layer 16 and a deformable thermoplastic layer 17. The FIGURE 2c embodiment of the recording member includes a substrate layer 18, a color reagent layer 19 and a deformable thermoplastic layer 21. The FIGURE 2c embodiment of the recording element may be considered as the lowest common denominator of all of the recording members according to this invention and accordingly, the recording member will be generically described in terms of the 2c embodiment with the other embodiments being further described only where they are distinct from the FIGURE 2c embodiment. The substrate 18 in all instances is used to provide a support for the remaining elements of the recording member. However, since in most instances of electrostatic thermoplastic deformation imaging, a grounded conductive electrode is used beneath the recording member to facilitate the deposition of charge in image configuration on the upper thermoplastic layer 21, substrate 18 may advantageously be made of a conductive material such as aluminum, copper or the like. Since in some instances, when it is desired to use the final image as a transparency and in other instances, it may be desirable to expose one of the recording member embodiments such as 2a or 2b from its underside, the conductive substrate may be formed in such a way as to be optically transparent. This may be accomplished by making the substrate of an optically transparent material such as glass, polyethylene terephthalate or other transparent materials coated with a thin optically transparent conductive layer such as tin oxide, copper iodide or very thin layers of gold, aluminum or other suitable materials. It should be understood, however, that the use of a conductive substrate or any substrate at all for that matter, is completely optional since the frostable layer may be charged without such a substrate. For example, they may be corona charged to opposite polarities on opposite sides simultaneously.

Overlying substrate layer 18 is the color reagent layer 19. In other alternatives, the "color reagent" may consist of a pH sensitive dye used in conjunction with an alkaline solution as the developing agent or a catalyst as a developing agent to activate two reagents in the layer 19. These and other alternatives of the type described supra will occur to those skilled in the chemical art. Accordingly, the terms "color reagent," "color reaction" and "developing agent" are to be broadly interpreted throughout the claims and specification in light of the explanation given in this and the aforementioned paragraphs.

Figure 2A:
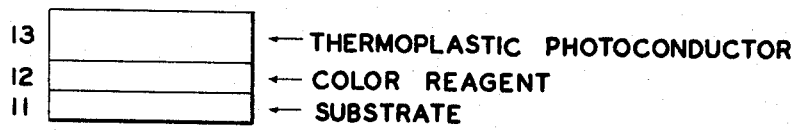
FIGURES 2a, 2b, 2c and 2d represent side sectional views of different embodiments of the novel recording member according to this invention.
Figure 2B:
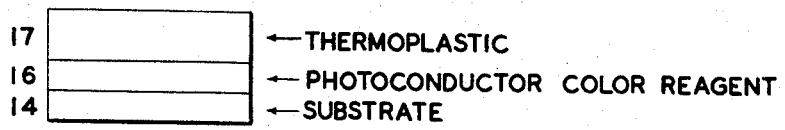

In the FIGURE 2b embodiment of the recording member, the color reagent layer must also have photoconductive properties. This may be accomplished either by using a color reagent which is itself photoconductive or by mixing a photoconductor with a color reagent material to make up layer 16. The color reagent may either be deposited in a continuous film as by vacuum evaporation or deposited from solution. In other instances where these techniques are not feasible, various particulate color reagent materials may be held in place on the layer with the use of a film-forming binder such as polyvinyl acetate, polymethyl-methacrylate or the like. In fact, with the FIGURE 2b embodiment of the invention, such a binder may be employed to hold both a photoconductive material and a color reagent material taking the form of a conventional binder plate film of the type employed in xerography and described, for example, in U.S. Patent 3,121,006 to Middleton and Reynolds. In a preferred form of this embodiment of the invention, the color reagent used in the film may be selected so as to serve a dual purpose; acting as both the color reagent material and as a sensitizer for the photoconductor. Thus, for example, if layer 16 includes a photoconductor such as particulate French process zinc oxide in a film-forming resin binder, it may also include a dye such as bromphenol blue which will both sensitize the zinc oxide photoconductor and because it is pH sensitive, will also act as a color reagent when the recording member is subjected to an alkaline solution. A great many sensitizing dyes of this type are known in the xerographic art as described, for example, in U.S. Patent 3,052,540 and any one of them which may be caused to change color by reaction with a suitable developing material may be employed in layer 16 of the FIGURE 2b embodiment of the invention. Above the color reagent layer 19 is a deformable thermoplastic layer 21 which may consist of any material capable of forming an electrostatically induced thermoplastic deformation image of either the "frost" type, as described in the above-referenced article and in copending U.S. patent application, Ser. No. 193,277, filed May 8, 1962 (entitled, "Electrostatic Frosting") or of the "relief variety" as described in copending application 193,276, filed May 8, 1962, and reference is made to the publication as well as these patent applications and a number of recent additional patents on thermoplastic deformation imaging including U.S. 3,118,786, U.S. 3,055,006, U.S. 3,063,872 and U.S. 3,113,179 for a teaching of a number of exemplary materials which may be used with the various deformation imaging techniques. Two further suitable deformable thermoplastics for use in the invention are Stabelite Ester 10, a glycerol ester of partially hydrogenated rosin sold by the Hercules Powder Company, Wilmington, Delaware and Velsicol EG 11, a terpolymer of styrene, indene and isoprene marketed by the Velsicol Chemical Company of Chicago, Illinois.

METHOD OF MAKING VELSICOL X37

Velsicol X37 is a product sold by the Velsicol Chemical Corporation and is prepared as follows:

A complex hydrocarbon petroleum fraction comprising a mixture of the following materials is polymerized with $Bf_3$ or $Al\ Cl_3$. The petroleum fraction contains lower aliphatic olefins having from 4 to 5 carbon atoms, such as for example, isoprene, butadiene and their derivatives; vinyl toluene, vinyl xylene, styrene and other alkylated styrenes; indenes and naphthenes. After the polymerization procedure is completed, the volatiles are removed and the residue remaining is Velsicol X37. It has a molecular weight of about 1200, an iodine number of about 113, a ring and ball melting point of 110 to 120, a specific gravity 1.07 to 1.10, a color (Gardner) 10 minus to 11 plus, acid number 0 to 2, and saponification number 0–2.

In the case if the FIGURE 2a embodiment of the recording element according to this invention, the deformable thermoplastic layer is also photoconductive. This property may advantageously be achieved by blending the deformable thermoplastic material such as the Staybelite resin described above with a compatible photoconductor. The photoconductor may be either in an insoluble particulate form in which case a two-phase system is formed or may be in the form of a material such as 2,5-bis-(-4')-diethylaminophenyl 1-(1')-1,3,4-oxadiazole which blends well with the Staybelite resin to form a homogeneous one-phase system.

The particular one of the recording member embodiments shown in FIGURES 2a–2d selected for use in the process of this invention will be a matter of choice as each has its advantages. Thus, for example, the FIGURE 2a embodiment could be used in a process where thermoplastic photoconductive insulating surface is first charged and then exposed to an image with light or other actinic electromagnetic radiation. This causes charge on the surface of the thermoplastic photoconductor to be dissipated in exposed areas through a connection of the conductive substrate to ground, thereby leaving a charge pattern on the surface of the thermoplastic conforming to the original to be reproduced. The second step in the process is to soften the thermoplastic layer with its electrostatic charge pattern to a viscosity at which the repulsive forces of the charge pattern on the layer overcome the surface tension forces of the layer. When this condition is met, a wrinkled frost pattern of ridges and valleys conforming to the charge pattern is formed on the surface of the layer. Finally, the thermoplastic is re-hardened to freeze the deformation image and subjected to the second color reagent B which diffuses through the deformed thermoplastic to form a light absborbing colored image corresponding to the deformation image.

The FIGURE 2b recording member embodiment may be used to form a deformation image corresponding to a light image by two different techniques which will be referred to as hereinafter as the simultaneous method and the sequential method. Briefly, the simultaneous method consists of charging and exposing the recording member while the insulating thermoplastic layer is maintained in its softened condition at a viscosity of about $10^5$ poises. Charge may be applied by an out-of-focus corona charging device while the conductive substrate is grounded. This tends to bring the insulating thermoplastic to a uniform potential; however, in light exposed areas, the photoconductive insulating layer becomes conductive and is effectively eliminated as part of the dielectric layer in the capacitor formed by the grounded substrate adjacent the thermoplastic and photoconductor which originally make up this "dielectric" layer. Higher charge density, therefore, results in these exposed areas because of their increased capacitance. By selecting system parameters such that the charge density in unexposed areas is below the deformation threshold, the desired deformation will only occur in exposed areas with the depth of the deformation corresponding to the intensity of light exposure. The thermoplastic is then hardened and subjected to the second color reagent as described in connection with the other embodiments of the invention.

In the sequential method, the free surface of the insulating thermoplastic is first charged to a uniform potential which may, for example, be +800 volts. The recording member is then exposed to a light image which renders the photoconductor, conductive in exposed areas, allowing negative charge to move up from the grounded substrate to the interface between the insulating thermoplastic and the photoconductor. The free surface is then recharged with the same polarity to uniform potential. Since the first exposure allows charge in exposed areas to move up through the photoconductor in these areas, charge is then only separated by the thermoplastic and upon recharging these areas can accept more charge so that their charge density is increased. The thermoplastic is then softened to form the deformation image which preferentially occurs in high charge density areas, fixed and treated with the second color reagent as described above.

Figure 2C:
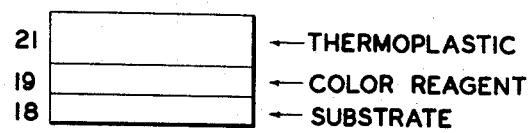

A charge pattern may be formed on the FIGURE 2c embodiment of the recording member by first forming such a charge pattern on a separate photoconductive insulating layer according to conventional xerographic reproduction techniques and then transferring this charge pattern to the insulating thermoplastic layer by bringing the two layers into very close proximity and utilizing breakdown techniques as described, for example, in U.S. Patents 2,982,647 to Carlson and 2,825,814 and 2,937,943 to Walkup. In addition, charge patterns conforming to selected, shaped, electrodes or combinations of electrodes may be formed on the insulating thermoplastic layer by the "TESI" discharge technique as more fully described in U.S. Patents 3,023,731 and 2,919,967 both to Schwertz or by techniques described in U.S. Patents 3,001,848 and 3,001,849 both to Walkup as well as by electron beam recording techniques, as described in the above-referenced Glenn patent. Here again, once the charge pattern is formed on the recording member, it is softened so that the deformation image is formed, re-hardened and subjected to the second color reagent until the light absorbing image is formed by reaction with the first color reagent beneath the thermoplastic. It should be noted that the FIGURE 2a and 2b recording member embodiments may also be used in the processes described in connection with thermoplastic deformation for the FIGURE 2c embodiment of the invention. If desired, the thermoplastic deformation image may be erased after the color reaction takes place so as to provide a smooth surface over the resulting light absorbing image. It also should be noted that the deformation image need not necessarily be hardened or frozen prior to subjection of the recording member to the second color reagent so long as the viscosity of the thermoplastic is high enough so that the deformation image is not erased prior to selective diffusion of the second reagent through the valleys of the deformation. It also should be noted that with any one of the recording members of the invention, the image produced may be either a negative or a positive of the deposited charge pattern. This may be accomplished by using a colorless color reagent in the recording member to produce a positive image when the second color reagent diffuses through the thermoplastic reacting with this first color reagent to form a colored compound or by using an opaque or colored reagent which becomes transparent or colorless respectively upon reaction with the second reagent. Thus, to form such a negative image, the color reagent in the recording member may consist of opaque copper which is reacted with iodine to form transparent copper iodide or the leuco form of a dye which is converted to its colored form.

Figure 2D:
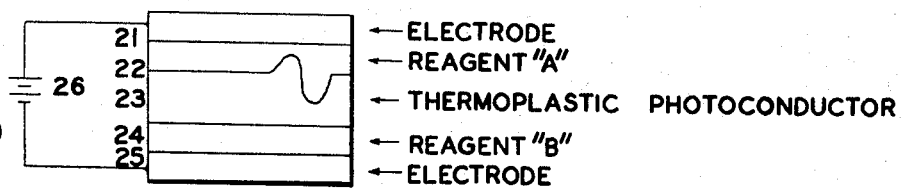

The FIGURE 2d embodiment of the recording element consists of an upper electrode 21, a layer of a first color reagent A, identified as 22, a thin layer of a photoconductive insulating deformable thermoplastic layer 23, an underlying layer of a second color reagent B, identified as 24, and a base electrode 25. In operation, this recording sandwich is merely exposed to the light image to be reproduced during the simultaneous application of potential across the electrodes 21 and 25 from potential source 26. One of the electrodes through which the exposure is made is, of course, optically transparent being composed of any suitable transparent electrically conductive material such as a thin layer of copper iodide, tin oxide, gold, or the like, on a glass support. Here again, it is to be understood that the use of the electrodes is optional, depending upon the charging technique employed. The simultaneous application of potential and light exposure portions of the photoconductive thermoplastic more conductive and allows for the formation of a charge pattern corresponding to the light image at the interface of the thermoplastic photoconductive layer 23 with layer 22. Upon heating, frost deformation takes place at this interface, as shown in the sectional view and, at the same time, the layer of reagent A material becomes molten so that it can easily permeate through valleys of the thermoplastic to react with underlying portions of the reagent B layer. If layer 22 has a higher conductivity, then the photoconductor deformation occurs in unexposed areas, whereas if it has lower conductivity, deformation occurs in the exposed areas. In another modification of the structure, layer 23 may be merely an insulating deformable thermoplastic and the photoconductor may be incorporated in layer 24.

The following examples are given only as exemplary of the invention to more easily enable those skilled in the art to practice the invention and are in no sense intended to limit its scope in any way.

Example I

A first color reagent layer made up of 25% weight of N,2,6-trichloro-p-benzoquinoneimine in a 90–10 copolymer of vinyl chloride and vinyl acetate, sold under the tradename, VYNS, by Union Carbide, was coated to a thickness of about 5 microns on an aluminum substrate. A coating of polyvinyl alcohol of about 4 microns in thickness was then applied over the first layer followed by an upper layer of Velsicol X–37 resin containing 2% by weight of the organic photoconductor 2,5-bis-(4')-diethylamino-phenyl - (1') - 1,3,4 - oxdiazole. This upper layer was coated with a thickness of about 2 microns.

This recording member was then charged with a corona discharge electrode, exposed to a light image and developed by heating until a frost pattern appeared on the thermoplastic surface conforming to the light exposure. 88% phenol (aqueous) was then poured over the frosted image and allowed to remain on its surface for about 2 minutes until a yellow image formed. The phenol was then removed with running water which also served to remove the upper Velsicol layer which also came off because the polyvinyl alcohol layer beneath it is water soluble. The yellow image was then seen to turn blue after a few seconds exposure to ammonia vapor following which the image turned red. The polyvinyl alcohol layer was used in this case because the imine color reagent is soluble in toluene and accordingly, if such a barrier were not used, the color reagent would tend to diffuse up into the deformable thermoplastic layer upon application of this layer from solution.

Example II

The procedure of Example I was repeated except that the time of phenol treatment was extended so that first a positive colored image was formed during the phenol treatment and when the time of this treatment was continued, image reversal occurred after about 30 seconds. With the short phenol treatment, the phenol only has sufficient time to diffuse through the deformed areas of the image in sufficient quantity so that it can react with the dichloroquinone imine to form the colored image, but not in sufficient quantity to dissolve and carry away the reagent. On the other hand, this short phenol treatment time does not allow sufficient time for the phenol to diffuse through undeformed thicker portions of the thermoplastic so that no color reaction takes place beneath these areas with this short treatment. Image reversal takes place with the longer phenol treatment because time is allowed for sufficient phenol to diffuse through the deformed areas to dissolve the dichloroquinone imine and remove it completely from the layer so as to leave colorless those areas beneath the deformed portions of the thermoplastic. Since this extended phenol treatment time also allows for sufficient time for the phenol to just begin penetrating the thicker undeformed areas of the thermoplastic, color reaction just begins to take place beneath these areas serving to form intense color beneath them.

Example III

An aluminum substrate was overcoated with a solution of 8 parts by weight of N-polyvinyl carbozole dissolved in 100 parts by weight of toluene and allowed to dry. This organic photoconductor was then overcoated with a thin layer of Staybelite resin (Staybelite is the glycerol ester of rosin which has been approximately 50% hydrogenated). The thus formed recording member was then charged with a corona discharge electrode, exposed to a light image, re-charged to 0 potential with an AC corona electrode and heated until a thermoplastic deformation image appeared in exposed areas on the surface of the Staybelite. After cooling, the recording member was developed with picryl chloride and a colored image was formed in the polyvinyl carbozole beneath frosted areas of the Staybelite.

Example IV

A layer of starch about 5 microns thick was coated on an aluminum substrate and overcoated with a layer of the Velsicol resin, described above in connection with Example I, having a thickness of about 3 microns. Half of the surface area of the thus formed recording member was charged with a corona discharge device and heated until a frost pattern appeared on the Velsicol surface. Upon cooling, the recording member with its hardened deformation pattern thereon was dipped in an iodine solution (0.1 N) whereupon areas of the starch below the frosted portion of the Velsicol turned black while those under the unfrosted portions did not change color.

Example V

A very thin layer of copper was vacuum evaporated onto a glass plate and overcoated with a 2 micron layer made up of a mixture of 10 grams of the Staybelite resin with .5 gram the organic photoconductor of Example I in 25 grams of toluene. The thus formed recording member was oven dried for 1 hour at 50° C. and then uniformly charged with a corona discharge electrode, exposed to a light image and heated until a thermoplastic deformation pattern appeared on its upper surface. The thermoplastic was then allowed to cool so that the deformation pattern was frozen into the thermoplastic, and this surface of the recording member was then dipped in a 0.1 N iodine solution. The iodine apparently diffused through the deformed areas of the thermoplastic and reacted with the copper to form optically transparent copper iodide beneath the deformed portions of the thermoplastic whereby a transparency of the light image was produced.

Example VI

Example IV was repeated except that an indicator dye (phenol red indicator) was added to the starch layer of the recording member and development of the image was by dipping in a water solution of 2,2'-aminoethylaminoethanol. The indicator turned pink in the frosted areas.

Example VII

A recording member was fabricated by coating a thin layer of polyvinyl carbozole in an aluminum substrate followed by an upper overcoating of the Velsicol resin described above. This recording member was charged with a corona discharge electrode, exposed to a light image and developed with a solution of trinitrofluorenone in dimethylformamide. This treatment produced a brown image in those sections of the polyvinyl carbozole layer beneath the frosted areas of the Velsicol overcoating.

Examples VIII–X

A 2-micron thick layer of the Velsciol resin described aobve and 3% by weight of the organic photoconductor described in connection with Example I was coated on a brass substrate, charged, exposed and heated until a frost image was produced. Upon cooling, the frosted surface of the recording member was subjected to the 88% phenol aqueous solution for 1 minute and then washed off in water. When the recording member was dipped in iron chloride solution for a few seconds, a colored image of excellent quality appeared beneath frosted areas of the recording member. It is believed that initial treatment of the frosted layer with phenol either softened, swelled or partially removed an upper thickness of the Velsicol layer. Since this layer was much thinner in the valleys of the frosted areas, virtually the whole thickness of the Velsicol beneath these valleys was affected by the phenol treatment, thereby allowing for the subsequent passage of the iron chloride solution through the affected valleys so that it could react with the underlying brass. In Example IX, the same procedure was carried out except that the phenol dip lasted for 25 seconds followed by a 30-second dip in hot, iron chloride solution. A very high quality reddish-brown image was produced in both instances. In Example X, a 50% solution of nitric acid was substituted for the iron chloride dip of Example VIII and a very deeply etched image was produced.

Example XI

A recording member was fabricated by coating a 20 micron layer of ninhydrin (20% by weight) in polyvinyl alcohol on an aluminum substrate. Over this color reagent layer, a 3 micron layer of a blend of 50% by weight of the organic photoconductor of Example I and 50% by weight of sucrose benzoate was applied. Sucrose benzoate has been found to be capable of forming thermoplastic deformation images upon heating when it bears an electrostatic charge pattern. Above this photoconductive thermoplastic layer, a thin layer of 2,2' aminoethylaminoethanol was applied and the recording member was then completed with the application of an upper, optically transparent, electrically conductive electrode consisting of a layer of very thin tin oxide on a glass substrate with the tin oxide surface facing in towards the remainder of the recording member. A DC potential was then applied across the upper and lower electrodes and the recording layer was exposed to a light image. This laght exposure rendered the photoconductive thermoplastic layer more conductive in exposed areas, allowing charge to move through it and the relatively, electrically conductive, color reagent layer. In unexposed areas, on the other hand, charge was retained. Upon heating, a frost deformation pattern was formed at the upper surface of the sucrose benzoate-photoconductor layer and the 2,2' aminoethylaminoethanol became molten. The molten 2,2' aminoethylaminoethanol diffused through the valleys in the frosted areas so that when it reached the underlying ninhydrin beneath these valleys, a deep blue color was produced. In this instance, the application of potential, exposure, application of heat a diffusion all occur simultaneously. Upon cooling, the materials all hardened to the solid state, thus fixing the image.

Example XII

A recording member was fabricated by coating a 20 micron layer of 20% by weight hydroquinone in polyvinyl pyrrolidone on an aluminum substrate. Over this layer of reducing agent, a 3 micron layer of a blend of 50% by weight of the organic photoconductor of Example I and 50% by weight of sucrose benzoates was applied so as to provide a photoconductive thermoplastic layer. Above this thermoplastic photoconductive layer, a thin layer of triphenyltetrazolium chloride dissolved in aminoethylaminoethanol was deposited and the recording member was then completed with the application of an optically transparent electrode consisting of a layer of very thin tin oxide on a glass substrate with the tin oxide surface facing in towards the remainder of the recording member. A DC potential was applied across the upper and lower electrodes while the recording member was exposed to a light image. At the same time, heat was applied to the recording member and a frost image was formed on the photoconductive thermoplastic layer while the triphenyltetrazolium layer became molten diffusing through the thermoplastic layer in valley areas of the frost image. Upon reaching the underlying hydroquinone layer, the triphenyltetrazolium chloride underwent the formazan reaction induced by the hydroquinone reducing agent and was converted from colorless to red, thereby forming a red image. Upon cooling, the materials all hardened to the solid state, thus fixing the image.

What is claimed is:

1. The method of forming a light absorbing image comprising forming a charge pattern on a thermoplastic layer which is capable of forming a plastic deformation image made up of hills and valleys corresponding to said deposited charge pattern when it is softened, said thermoplastic layer being deposited upon an underlying layer including a color forming reagent, softening said thermoplastic layer until a deformation pattern made up of hills and valleys appears on the surface of said thermoplastic, and then subjecting at least the thermoplastic side of the recording member formed by said thermoplastic layer, and said color reagent, to contact with a second color reagent capable of a color-forming reaction with said first color reagent until said second reagent diffuses through the thinnest valley portions of said deformed thermoplastic layer and reacts with said first color reagent, said second color reagent including a material which is at least a partial solvent for the colored reaction product formed by said first and second color reagents, and continuing the contact of said second reagent with said thermoplastic until it removes said reaction product from beneath valley areas of said thermoplastic, and diffuses through undeformed areas to react with said first color reagent therebenath, whereby a reversal image is formed.

References Cited

UNITED STATES PATENTS

| | | | |
|---|---|---|---|
| 3,055,006 | 9/1962 | Dreyfoos et al. | 96—1.1 X |
| 3,196,011 | 7/1965 | Gunther et al. | 96—1.1 |
| 3,196,013 | 7/1965 | Walkup | 96—1.1 |
| 3,238,041 | 3/1966 | Corrsin | 96—1.1 |
| 3,239,840 | 3/1966 | Chafaris | 346—74 |
| 3,266,045 | 8/1966 | Schaffert | 340—173 |
| 3,291,601 | 12/1966 | Gaynor | 96—1.1 |
| 3,214,272 | 10/1965 | Ploke | 96—1.1 |

NORMAN G. TORCHIN, *Primary Examiner.*

C. E. VAN HORN, *Assistant Examiner.*